United States Patent [19]

Ganesan et al.

[11] Patent Number: 5,394,471
[45] Date of Patent: Feb. 28, 1995

[54] METHOD AND SYSTEM FOR PROACTIVE PASSWORD VALIDATION

[75] Inventors: Ravi Ganesan, Laurel; Christopher I. Davies, Columbia, both of Md.

[73] Assignee: Bell Atlantic Network Services, Inc., Arlington, Va.

[21] Appl. No.: 121,852

[22] Filed: Sep. 17, 1993

[51] Int. Cl.⁶ ............................................. H04L 9/00
[52] U.S. Cl. ...................................... 380/23; 380/1; 380/4; 380/25; 380/49; 380/50
[58] Field of Search ...................... 380/1, 2, 4, 23–25, 380/49, 50

[56] References Cited

U.S. PATENT DOCUMENTS

| | | | |
|---|---|---|---|
| 4,440,976 | 4/1984 | Bocci et al. | 380/1 |
| 4,926,475 | 5/1990 | Spiotta et al. | 380/2 |
| 4,974,191 | 11/1990 | Amirghodsi et al. | 380/1 X |
| 5,199,069 | 3/1993 | Barrett et al. | 380/2 X |
| 5,307,409 | 4/1994 | Driscoll | 380/2 |

OTHER PUBLICATIONS

Kohl, John et al., "The Kerberos TM Network Authentication Service" (V5), Internet-Draft, Sep. 1, 1992, pp. 1–69.
Spafford, Eugene H., "Observing Reusable Password Choices", Jul. 31, 1992, pp. 1–12.
Spafford, Eugene H., "OPUS: Preventing Weak Password Choices", Jun. 1991, pp. 1–14.
Federal Register, vol. 57, No. 174, Tuesday, Sep. 8, 1992, Notices, pp. 40895–40896.
Smid, Miles E. et al., "The DAta Encryption Standard: Past and Future", *Proceedings of the IEE,* vol. 76, No. 5, May 1988, pp. 550–559.
Nagle, John, "Tell if a Password is 'Obvious'", vol. 16, Issue 60, Nov. 10, 1988.
Bellovin, Steven M. et al., "Encrypted Key Exchange: Password-Based Protocols Secure Against Dictionary Attacks", *IEEE,* 1992, pp. 72–84.
Bishop, Matt, "Proactive Password Checking", pp. 1–9, No date given.
Ganesan, Ravi et al, "Statistical Techniques for Language Recognition: An Empirical Study Using Real and Simulated English", Sep. 28, 1993, pp. 1–48.
Feldmeier, David C. et al., "UNIX Password Security-Ten Years Later", pp. 44–63, no date given.
Ganesan, Ravi et al., "Statistical Techniques for Language Recognition: An Introduction and Guide for Cryptanalysts", *Computer Science Technical Report Series,* Feb. 1993, pp.1–32. Supplement, Sep. 28, 1993, pp. 49–129.

*Primary Examiner*—Bernarr E. Gregory
*Attorney, Agent, or Firm*—Lowe, Price, LeBlanc & Becker

[57] ABSTRACT

An improved method for password validation comprising the steps of identifying bad passwords having one or more characters; computing a frequency of occurrence of bad password characters; computing a probability of occurrence T of the bad password characters within the bad passwords based upon the computed frequency of occurrence; identifying a proposed password having one or more characters; and comparing the proposed password characters with the probability of occurrence T of the bad password characters. The method further comprises the steps of establishing a validation threshold and validating the proposed password based upon the correspondence between (i) a value, BAp, reflecting the relationship between the probability of occurrence T of bad password characters within bad passwords and the proposed password characters and (ii) an established validation threshold. A Markov model is use to compute the probability of occurrence. The present invention also includes an improved password validation system.

32 Claims, 4 Drawing Sheets

METHOD AND SYSTEM FOR PROACTIVE PASSWORD VALIDATION

BACKGROUND OF INVENTION

1. Field of the Invention

This invention relates to security passwords and more particularly to a method and system for proactively validating passwords.

2. Description of the Related Art

Poorly chosen passwords continue to be a major cause of security breaches. The increasing popularity of such products as the Unix Operating System and the Kerberos Authentication Protocol in commercial environments accentuate this problem, as both are vulnerable to security breaches by dictionary attacks which search for poor passwords.

Given the choice, most users choose passwords from a "likely password" key space, $K_1$, that is a small fraction of the entire key space, K, available to them. This smaller key space is typically composed of bad passwords and bad noisy passwords. Bad passwords are those chosen from natural language, jargon, acronyms, dates, or other numeric series, and/or derivatives thereof. Bad noisy passwords consist of a bad password plus noise (e.g. tiger2 or compquter). The small size of $K_1$, facilitates breaches of security through exhaustive searches of the "likely password" key space, which can be performed using conventional techniques and technologies that are well known in the art. For instance, in the Unix operating system (see Morris, R. and K. Thompson. "Password security: A case history", Communications of the ACM, 22(11), November 1979), user passwords are transformed using a one way function based upon the data encryption standard (DES) (see Data Encryption Standard, National Bureau of Standards, Federal Information Processing Standards, Publication No. 46-1 (Jan. 15, 1977)), and then stored in a password file that is usually accessible to a number of individuals and is in all cases accessible to the administrators of the system to which the password provides access. As the one way function itself is not secret, an adversary can methodically apply this function to all words in $K_1$, and then compare the results to those in the password file. The Kerberos Authentication Protocol (see Kohl, J. C. Neuman and J. Steiner, "The Kerberos Network Authentication Service", MIT Project Athena (Oct. 8, 1990) Version 5, Draft 3), is also vulnerable to such dictionary attacks as, for reasons not relevant here, the protocol makes it possible for an adversary having a user password to request server access to encrypted messages. Further, by eavesdropping on the network, the adversary can also obtain additional encrypted messages which can be decrypted using the same exhaustive key search technique on $K_1$.

The size of the key space that can be searched efficiently by an adversary is much larger than is usually believed by most users. Karn and Feldmeier have discussed the size of the key space that can be searched using conventional techniques and technology. (See Karn, P. R. and D. C. Feldmeier, "UNIX password security—Ten years later", Advances in Cryptology—CRYPTO '89, G. Brassard (Ed.) Lecture Notes in Computer Science, Springer Verlag, 1990). Although this discussion is directed towards UNIX password security, the Karn and Feldmeier analysis is widely applicable to typical systems which have artificially small password key space and are therefore susceptible to a key search attack. Protection against such attacks can be enhanced by either altering the system itself, for instance, as proposed by Bellovin and Merritt to secure Kerberos (see Bellovin, S. and M. Merritt, "Encrypted Key Exchange" IEEE Computer Society Symposium on Security and Privacy, May 1992, Oakland, Calif.) or enlarging the size of the likely password key space $K_1$ until it approaches the size of K, where K is very large. Another approach to improving password security is to establish a system to select a random password of key space K for the user. This later approach, however, is particularly unfriendly to the user and can lead to users maintaining a written ledger of their passwords to avoid having to memorize a long and arbitrarily selected password.

A proactive password checker is often a component of a password changing program. The checker attempts to validate the quality of a password chosen by the user before making the change. In addition to checking the size of the password and whether the password is derived from commonly known user related information, the heart of a conventional proactive password checker is the maintenance of a dictionary of bad passwords against which the selected password is checked.

One problem with conventional checkers is that the dictionary of passwords can require tens of megabytes of storage space. Another problem is that in any distributed processing environment the dictionary may have to be replicated on several servers or processing units. A further problem with such systems is that the time to search the dictionary increases logarithmically with the number of bad passwords being stored within the dictionary. Further still, using such a dictionary to filter out bad noisy passwords is difficult.

Proactive password checking systems are based on the philosophy that, with sufficient guidance, users can select passwords from a fairly large key space, which are not likely to be guessed or otherwise broken in the course of a key search attack. Conventional proactive password checking systems interact with the user, explain the type of passwords that are desirable, check for the appropriate password size and mix of upper and lower case letter characters, numerals and special characters, check if the password is drawn from the user's name or other user specific information, and finally check if the password is in a dictionary of bad passwords. (see Bishop, M., "Proactive Password Checking", 4th Workshop on Computer Security Incident Handling, August 1992).

Two conventional proactive password checking systems have been proposed to reduce the storage space required to check a selected password against a dictionary of bad passwords. Both follow conventional pattern matching frameworks (see Ganesan, R. and A. Sherman, "Statistical Techniques for Language Recognition: An Introduction and Guide for Cryptanalysis", TR CS-93-2, University of Maryland, 1993). Using this framework a set of characteristics, C, is first extracted from a given dictionary of bad passwords. To save space, C must be smaller than the dictionary itself. Next, a test, $T_p$, is used to determine if a given password has characteristics similar to C. These checking systems differ however in the characteristics, C, extracted from the dictionary and consequently the test, $T_p$, used to determine whether or not the selected password is good or bad.

The Nagle system selects a three dimension boolean matrix, B [i, j, k] as the set of characteristics, C, where i, j and k correspond to the indices in a set. Next, the bad password dictionary is scanned. Each time a sequence of three consecutive characters, henceforth referred to as trigrams, is observed the corresponding bit in the boolean array is set. For example, the password abcd1 will cause B [a,b,c], B [b,c,d] and B [c,d,other] to be set to 1. By scanning all the passwords in the dictionary many such bits will be set. After completion of the dictionary scan off-line (i.e., in non-real time), all trigrams from the bad passwords are extracted. The proposed password is validated on-line (i.e., in real time) as a good password only if at least two trigrams do not have corresponding bits set in B. The Nagle technique does an excellent job of screening most bad passwords. However, it does a poor job of screening bad noisy passwords.

The OPUS checking system is based on Bloom filters (see Spafford, E. H., "OPUS: Preventing Weak Password Choices", Purdue Technical Report CSC-TR 92-028, June 1991) which are commonly used in spelling checkers. Using the OPUS approach, B [n] is selected as a boolean array of size N. Next, a set of hash functions $H_1, H_2, \ldots, H_D$ is selected. For a given password, each hash function assigns a number in the range 0 ... N. Each bad password in the dictionary is run through all hash functions and for each of the hash functions a number, $n_i$, is generated, and the bit in the boolean array B [$n_i$], is set. A selected password is then run through the hash functions generating $n_1, n_2, \ldots n_D$. If any of the boolean array bits generated by the selected password are not within the boolean array bits set by the bad passwords, then the selected password is validated. If all the generated boolean array bits are within the set, then it is likely that the selected password is in the dictionary and therefore should not be validated. However, there is a probability with the OPUS approach that a good password may be mistakenly identified as being in the dictionary of bad passwords. By increasing the size of the boolean array this probability can be reduced. Also appropriate selection of the hash functions will improve the accuracy of the OPUS system. By its nature, the OPUS approach will consistently recognize a selected password which is also a bad password in the selected dictionary of bad passwords. However, the OPUS approach does not recognize bad noisy passwords. It also requires a boolean array large enough to sufficiently reduce the probability that good passwords will be mistakenly identified as bad passwords. Because of the required size of the boolean array, reductions in the required storage capacity may be limited.

Thus, it is an object of the present invention to provide a method and system to validate a chosen password before the selection is finalized. It is a further object of the present invention to provide a method and system for performing such validation without the need to store a dictionary of bad passwords and/or bad noisy passwords. It is a still further object of this invention to provide a method and system for validation which does not require a large database of information to be stored on a server or other storage device for use in the validation process. It is another object of this invention to provide a method and system which can be utilized to quickly perform password validation. It is yet another objective of this invention to provide a method and system for proactively checking against bad noisy passwords without having to generate the bad noisy passwords on-line.

Additional objects, advantages and novel features of the invention will become apparent to those skilled in the art upon examination of the following as well as by practice of the invention. While the invention is described below with reference to preferred embodiments for proactive validation of passwords, it should be understood that the invention is not limited thereto. Those of ordinary skill in the art having access to the teachings herein will recognize additional applications, modifications and embodiments in other fields (including, but not limited to, those relating to smart cards, automatic tellers and automatic locks), which are within the scope of the present invention as disclosed and claimed herein and in which the present invention could be of significant utility.

SUMMARY OF THE INVENTION

The present invention provides an improved method and system for password validation. In accordance with the invention bad passwords comprised of one or more characters are identified. The frequency of occurrence of all or selected bad password characters is then computed. Next, the probability of occurrence T, within the identified bad passwords, of the bad password characters is determined based upon the computed frequency of occurrence. After a validation password has been identified, the validation password characters are compared with the probability of occurrence T of the bad password characters. The validation password is either accepted (i.e., validated) or rejected based upon the correspondence between the validation password characters and the probability of occurrence T of the bad password characters.

In accordance with the invention the probability of occurrence T of the bad password characters can be represented by the mean and standard deviation for a set of log likelihood functions computed using the probability of occurrence T of the bad password characters. The validation password characters can be represented by a set of log likelihood functions likewise computed using the probability of occurrence T of the bad password characters. Additionally a test value BAp can be computed using the mean and standard deviation of the set of log likelihood functions for the bad password characters, and the set of log likelihood functions for the validation password. The test value, BAp, can then be compared with a threshold value to determine whether the validation password is acceptable.

Preferably a second order Markov model comprised of a common alphabet plus selected other characters is utilized in computing the probability of occurrence T of the bad password characters. If the English language is of interest, the Markov model will preferably contain twenty-eight characters. Because of the preference for a second order Markov model, both the bad password and validation password characters are accordingly used in the form of trigrams. Frequency of occurrence values of five or less are preferably adjusted.

Applying the method in the preferred manner, the mean and standard deviation of the log likelihood function and the probability of occurrence T for the bad password characters would be computed off-line (i.e., in non-real time) and, along with the established validation threshold value, stored electronically. After identification of a validation password the computation of the log likelihood function for the validation password and the BAp value, and the comparison of the BAp value with the threshold value are performed on-line (i.e., in real time).

The improved password validation system of the present invention includes a station for accessing a database of bad passwords having one or more characters, and directing those portions of the validation system which will preferably perform off-line (i.e., in non-real time). The station, data base storage device and processing unit are linked such that the processor is able to access the database of bad passwords to compute a frequency of occurrence for the bad password characters. The processor then computes a probability of occurrence T, within the bad passwords, of the bad password characters using the computed frequency of occurrence. The same or a different station may be used to input into the system a proposed password for validation. A processor, which may be the same processor mentioned above or a different processor, but will be referred to as the second processor in this Summary, is used to compare, preferably on-line (i.e., in real time), the proposed password characters with the computed probability of occurrence T of the bad password characters.

The first mentioned processor may also be used to compute a set of log likelihood functions for the bad password characters using the computed probability of occurrence T. The probability of occurrence T can be represented in the second processor by the mean and standard deviation of this set of log likelihood functions. Similarly the second processor can be used to compute a set of log likelihood functions for the proposed password characters which can be used to represent the bad password characters in the comparison performed by the second processor.

The second processor can also be provided with the capability to compute a test value, BAp, based upon the mean and standard deviation of the log likelihood function for the bad password characters and the log likelihood function of the proposed password characters. A validation threshold value can be accessed by the second processor and compared with the BAp value to determine if the proposed password is acceptable. The first processor preferably includes the capability to adjust the frequency of occurrence of any bad password character which is computed to be less than or equal to five.

The first processor, as noted above, is used for computing the mean and standard deviation of the set of log likelihood functions for the bad password characters and the probability of occurrence T of bad password characters within the bad passwords and would preferably operate off-line (i.e., in non-real time). On the other hand, the second processor which is used to compute the log likelihood function for the proposed password and the BAp value, to compare the BAp value to the threshold value and to notify the user of acceptance/rejection, preferably performs on-line (i.e., in real time).

The system also includes a server, local hard disk or other electronic storage device upon which the mean and standard deviation values, the probability of occurrence T value and the validation threshold value are stored. The second processor can then access this data once a proposed new password is identified. The validation system of the present invention can be implemented as part of a local or wide area network or as part of single a stand-alone system configuration.

DESCRIPTION OF THE PREFERRED EMBODIMENT

The traditional pattern matching framework in most password validation systems is (i) to extract a set of characteristics, C, from a given bad password dictionary in an off-line single session mode and (ii) then, on a real time basis, to use test, $T_p$, to determine if a chosen password has similar characteristics to C.

Before describing the preferred embodiment of the present invention it will be helpful to first discuss the Markov model, which is preferably used to extract a set of characteristics, C, in accordance with the present invention. For purposes of this discussion it is assumed that the bad password dictionary to be used was generated by a K order Markov model, and that characteristics, C, correspond to the transition probabilities of the model. Test, $T_p$, in accordance with the present invention, determines, preferably using statistical inference on the Markov chains, whether a given string of characters of a chosen password was generated by a given Markov model.

Figure 1:
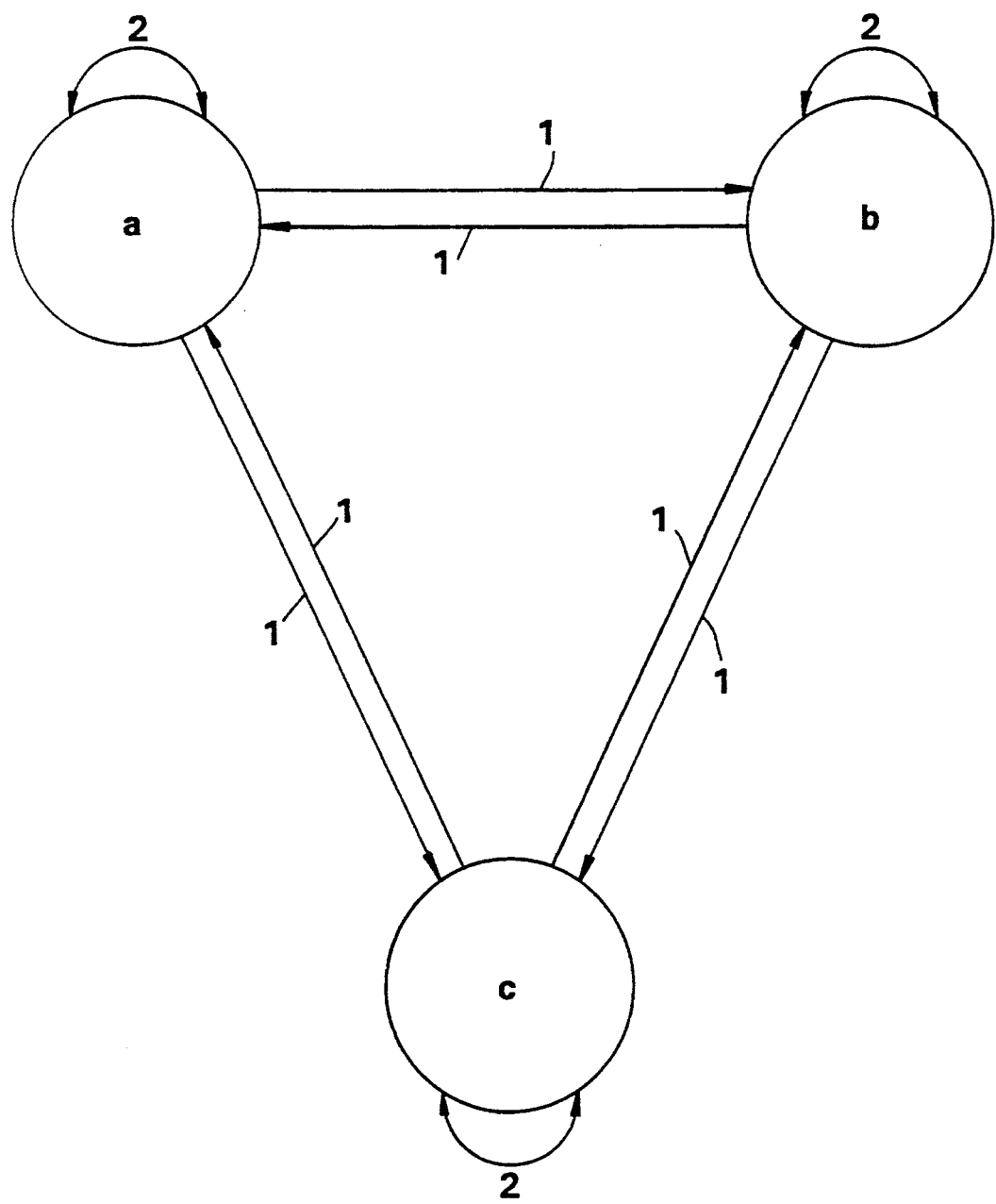
FIG. 1 illustrates an example of a Markov model.

An example of the Markov model is shown in FIG. 1. Likely strings 1 can be generated by beginning in any state and following high probability transitions such as ab, bc, ac, and ba from FIG. 1. The unlikely strings 2 generated by this model contain zero transitions, for example aa, cc, cc, bb, aa of FIG. 1.

A Markov model M is a quadruple, [m,A,T,k], where m is the number of states in the model, A is the state space, T is the matrix of transition probabilities and k is the order of the chain. In FIG. 1, an example of such a model for the three character language shown is: M=[3],[a,b,c], T, 1], where $$T = \begin{bmatrix} 0.0 & 0.5 & 0.5 \\ 0.2 & 0.4 & 0.4 \\ 1.0 & 0.0 & 0.0 \end{bmatrix} \quad (1)$$

giving T [a,a]=0.0, T[a,b]=0.5, etc.

A key characteristic of a K order Markov model is that the probability of transition T[a,b], depends only on the previous states that have been visited. In a first order model the probability of a transition ending in state b depends only on the state from which the transition began (say a). Therefore T[a,b]=Prob (b,a). In a second order model, the probability of entering state b from state a also depends on the state of the process prior to entering a. For example, for state c, T[a,b]=Prob (b,ac).

As FIG. 1 illustrates, the state space very naturally corresponds to the alphabet of the natural language from which passwords are expected to be drawn.

Although the use of bigrams (i.e., a first order Markov model) is adequate for certain applications, the use of trigrams is preferred. A second order Markov model will give better overall results than a first order model. However, it should be noted that the size of the Markov chain that will need to be stored increases with increasing order of the Markov model. Thus for a first order model, the matrix may occupy about 5–6 KB of storage, while for a second order model it could occupy 175 KB.

Figure 2:
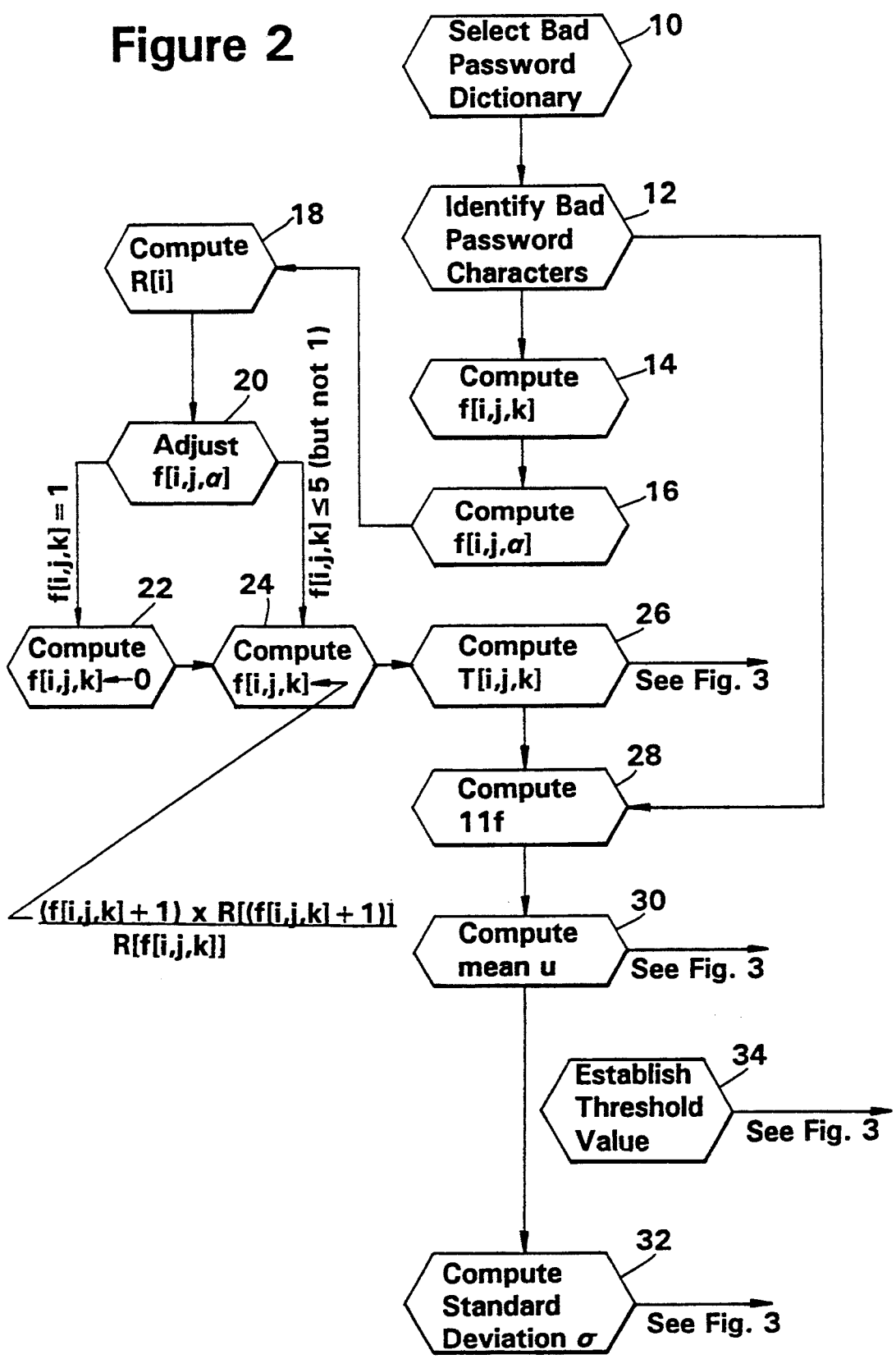
FIG. 2 is a flowchart illustrating the steps implemented off-line (i.e., in non-real time) in accordance with the method of the present invention.

Referring now to FIG. 2 which shows the method steps in accordance with the present invention, which are preferably performed off-line. The present invention preferably uses a state space size of 28, where A=[a,b, ... z,SPC, OTHER]. No differentiation is made between lower and upper case letters, and numbers, special characters and control characters are mapped into the "OTHER" category which is then treated like any other character.

Having specified m, A, and k, the probabilities in the transition probability matrix T can be computed. The first step in making this computation is to select, in step 10, a dictionary of known bad passwords. A medium sized dictionary of bad passwords (about 1 MB) is typically used, as this is adequate for most applications. If desired, a subset of the entire dictionary of bad passwords can be selected. The bad password characters are identified in step 12. Assuming that the process reached the j state from the i state the transition probability $T[i,j,k]$, which is the probability of a transition from the j state to the k state can be determined as follows:

1. From the bad password characters identified in step 12, first compute, in step 14, the frequency matrix f for the bad passwords, where $f[i,j,k]$ is the number of occurrences of a trigram (i.e., any three consecutive bad password characters) consisting of the i,j and k characters. For instance, the password, parsnips, yields the trigrams par, ars, rsn, sni, nip and ips.

2. Next, for the bigram, ij, compute, in step 16, $f[i,j,\infty]$ as the number of trigrams beginning with ij. For example, $f[a,b,\infty]$ would be the number of trigrams of the form aba, abb, abc, ... abSPC, abOTHER.

When a second order Markov model is used to obtain greater accuracy, the performance of the system is effected because the trigram transition probability matrix will contain many zeros. A number of different techniques for adjusting the transition probability matrix to deal with these zeros are known in the art. In accordance with the present invention, the Good-Turing technique of adjusting the frequencies is preferred. (See Good, I. J., "The Population Frequencies of Species and the Estimation of Population Parameters", Biometrika, Vol. 40, 1953.) Utilizing this technique, after computing $f[i,j,\infty]$ as described above, the adjusting proceeds in steps 18–24 as follows:

1. Compute, in step 18, values for an array R, where R[i] contains the number of times i occurs in frequency matrix f. For instance, if frequency matrix f contains 500 zero elements, then R[0]=500. If desired, the distribution of R can be made smooth by conventional statistical techniques.

2. In step 20, if $f[i,j,k]=1$, then proceed to step 22 and perform $f[i,j,k] \leftarrow 0$ in accordance with Katz's recommendation (See Katz, S. M., "Estimation of Probabilities from Sparse data for the Language Model of the IBM Speech Recognition System", IEEE Transactions of Acoustics; Speech and Signal Processing, Vol. ASSP-32, 1985).

3. When the step 20 comparison indicates that $f[i,j,k]$ is less than or equal to 5 the frequency matrix f, including any adjusted frequency matrix f from step 22, is adjusted in step 24 as follows:

$$f[i,j,k] \leftarrow \frac{(f[i,j,k] + 1) \times R[(f[i,j,k] + 1)]}{R[f[i,j,k]]} \quad (2)$$

The transition probability T can now be computed in step 26, using, if applicable, as the adjusted frequency matrix f:

$$T[i,j,k] = \frac{f[i,j,k]}{f[i,j,\infty]} . \quad (3)$$

Those skilled in the art will recognize that depending on the accuracy desired one could go directly from step 16 to step 26 without the frequency matrix adjustment performed in steps 18–24.

The above computation of T is commonly referred to as a maximum likelihood estimate of the transition probabilities.

Having completely parameterized the Markov model M=[28,[a,b, ... z,SPC,OTHER], T, 1], the process of extracting the characteristics, C, from the dictionary has been accomplished. It will now be shown how to determine if a given password, P, has characteristics similar to C.

By modeling the dictionary as a Markov model, the question has been changed from (i) is the chosen password a bad password or bad noisy password to (ii) is the chosen password generated by the Markov model corresponding to the dictionary of bad passwords. Answering this question will require the use of only the transition probability matrix, T, from step 26 and the candidate password P which will be subsequently identified in step 36 (See FIG. 3).

The test, BAp, described below uses a log-likelihood function for determining whether a given string of characters from password P belongs to a particular Markov chain. Let the password P, be depicted by $p_1, p_2 \ldots p_l$, where l is the length of the password. Given a particular transition probability matrix, T, and a password, P, the log-likelihood function 11f for the bad passwords as well as the chosen new password, is computed in steps 28 and 38 (See FIG. 3) by:

$$llf = \sum_{i=1}^{l-2} \ln(T[p_i,p_{i+1},p_{i+2}]) \quad (4)$$

For instance, for the password unknown2, 11f is given by:

$$11f = \ln(T[u,n,k]) + \ln(T[n,k,w]) + \ln(T[k,w,o]) + \ln(T[w,o,n]) + \ln(T[o,n,OTHER]) \quad (5)$$

The "OTHER" character is treated like all other characters, except that it is actually used for any character which is not present in the alphabet used and SPC. Since the transition probabilities are, by definition, less than one and since the natural logs of the transition probabilities are summed, 11f will always be negative or zero.

Figure 3:
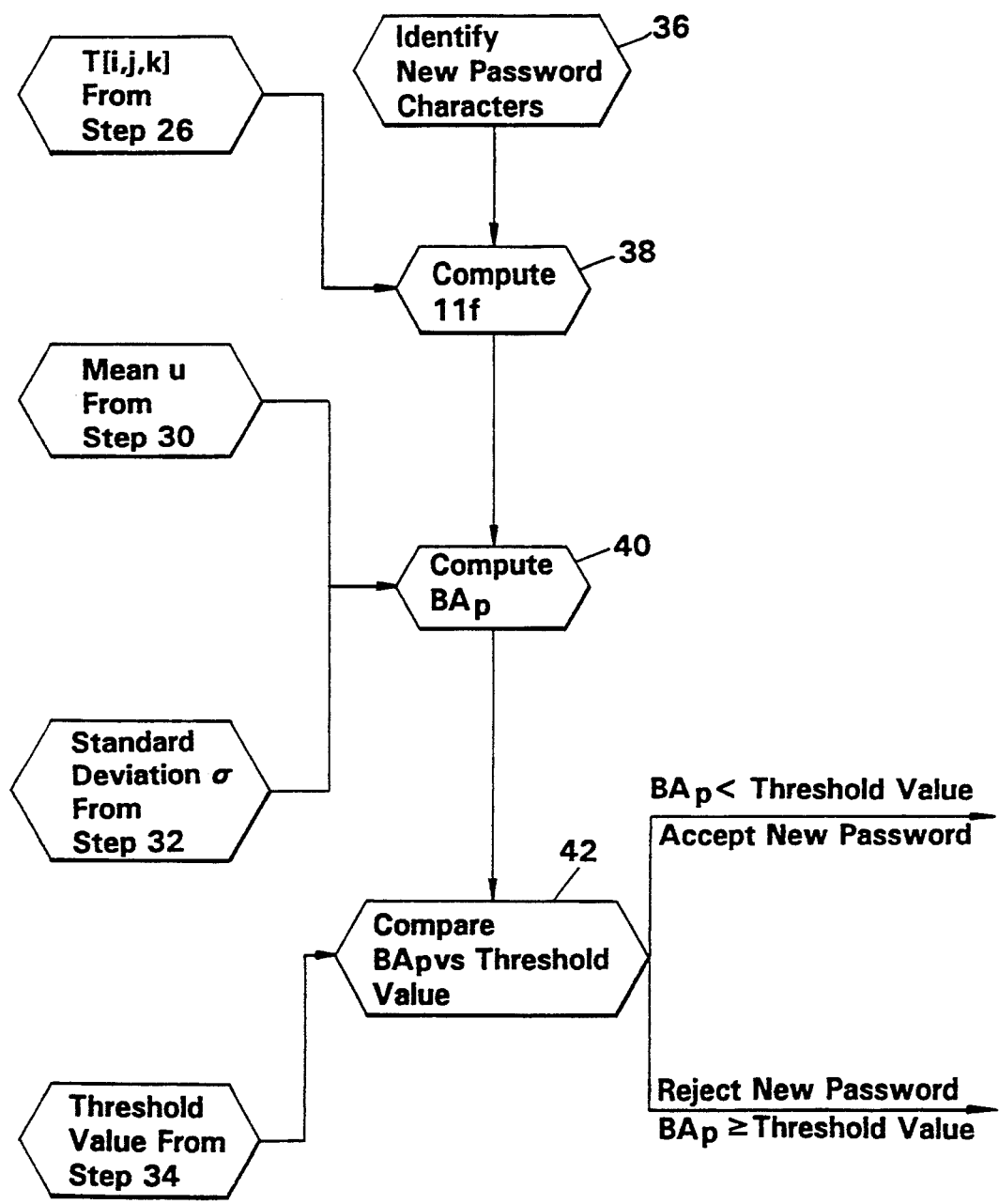
FIG. 3 is a flowchart illustrating the steps implemented on-line (i.e., in real time) in accordance with the method of the present invention.

Referring now to FIG. 3 which shows those steps preferably performed on-line (i.e., in real time), conventional statistical techniques of scaling, centering and normalizing are used in step 40 to complete the test, BAp, by comparing the bad password characters C established in step 26 with the characters of the password identified in step 36 as follows:

$$BAp = \frac{\frac{llf}{1-2} - \mu}{\sigma} \qquad (6)$$

where 1-2 is the number of trigrams formed by the identified password, and $\mu$ and the $\sigma$, are the estimated mean and standard deviation computed in respective steps 30 and 32 of FIG. 2. The mean and standard deviation are calculated by computing the value of $llf \div 1-2$ for every selected password in the bad password dictionary, D, from which the transition probability matrix, T, was computed, and then calculating the mean and standard deviation of the resulting values using conventional techniques.

Due to the centering and normalizing, BAp has, by definition, a mean of zero and a standard deviation of 1. Knowing this, a threshold is preset in step 34 of FIG. 2, preferably at 2.6 times the standard deviation (i.e., ±2.6) so as to correspond to approximately 99% of the area under the standard normal curve. Accordingly, in step 42, any identified password that has a BAp value of less than −2.6 is accepted as a good password. Passwords close to the mean, i.e., 0, are preferably considered to be drawn from the bad password dictionary and hence considered unacceptable. Passwords with high values, e.g. +3.1, are also considered unacceptable since their characteristics are similar to those of the selected bad passwords.

The test, BAp, described above with reference to FIG. 3, should be performed quickly and, therefore, preferably takes place in real time. Additionally it is beneficial if the storage space required on a system utilized in performing the test is keep small. In this regard, using the present invention only the transition probability matrix, T, and the mean, $\mu$, the standard deviation, $\sigma$, and the validity threshold value are required to be stored. The mean, standard deviation, and the probability matrix T are all computed in non-real time. The threshold is likewise established in non-real time. Accordingly, test, BAp, is performed in real time and only requires computation of $llf$ for the proposed new password and then BAp, and thus requires minimal computation time. The natural log function for bad passwords need not be computed in real time since, rather than storing the transition probabilities, T[i,j,k], it is possible to store ln(T[i,j,k]).

Figure 4:
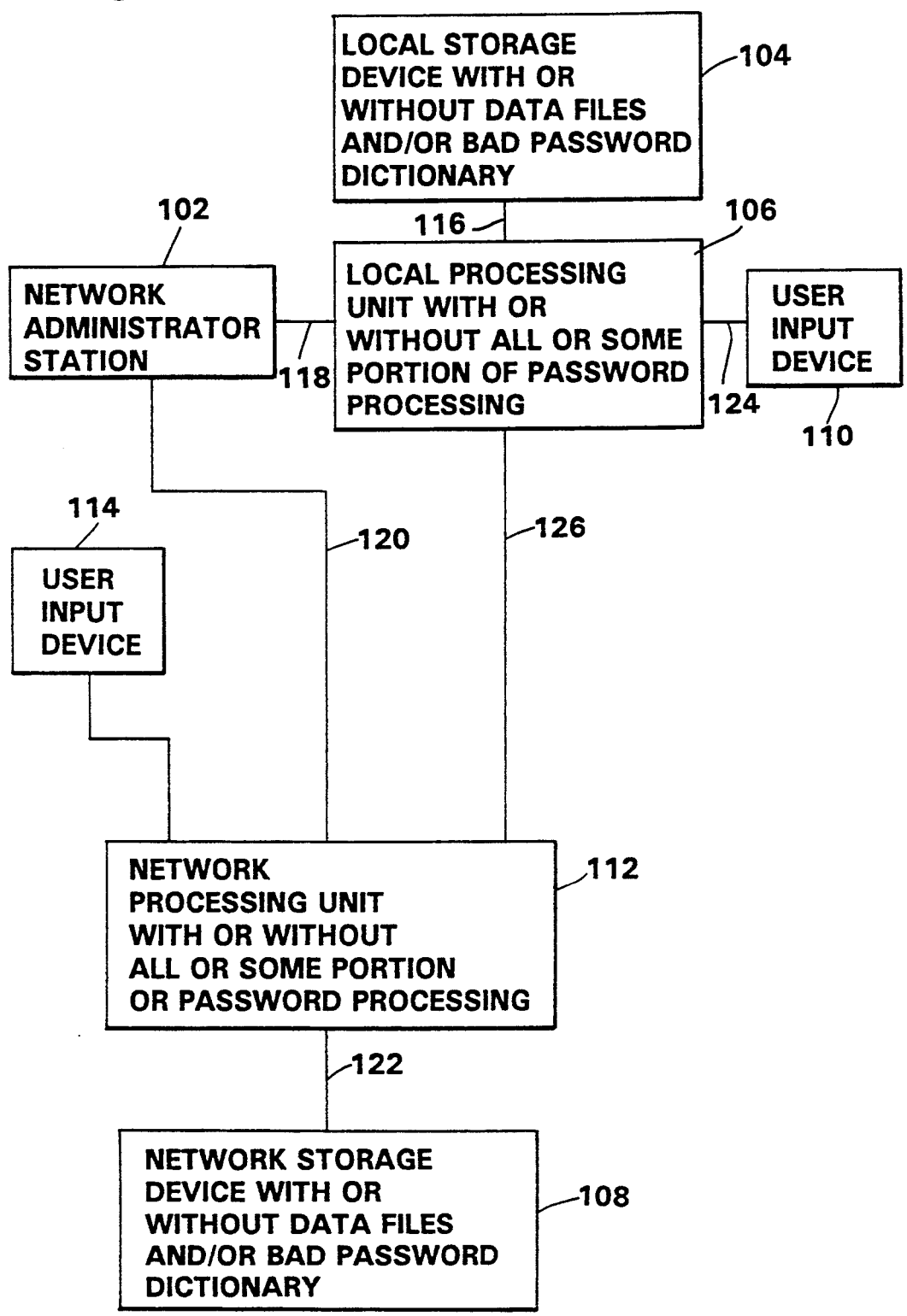
FIG. 4 is a block diagram of a system for proactive password validation in accordance with the present invention.

FIG. 4 is a block diagram representative of the system of the present invention. It will be understood by those skilled in the art that the present invention can implemented in any number of configurations and that the systems shown, in FIG. 4, and hereinafter described, are exemplary of the types of systems encompassed by the present invention. In an embodiment for off-line processing, an administrator's station 102 is used to access, through interfaces 116 and 118, a bad password dictionary residing in local storage device 104 via local processing unit 106. All or a selected portion of the password characters are downloaded to the local processing unit 106 via interface 116. Local processor 106 includes password processing capable of extracting, as described above, the desired characteristics from the selected bad passwords. Such processing preferably utilizes a second order Markov model. Processor 106 first computes the frequencies of occurrence, f[i,j,k] and f[i,j,∞], of the bad password characters. Then, using the calculated frequencies of occurrence, processor 106 computes the probability of occurrence, T[i,j,k] of those same characters. The password processing capability of local processor 106 may also include frequency adjustment capability for adjusting f[i,j,k] and f[i,j,∞] using, for example, the Good-Turing technique described above, prior to computing the probability of occurrence T. The local processing unit 106 next computes a set of log likelihood functions $llf$ for the selected bad password using the probability of occurrence T. The estimated mean $\mu$ and standard deviation $\sigma$ for the log likelihood function $llf$ is next computed by processor 106. The administrator can now download, using station 102, data files containing the computed probability of occurrence T, mean $\mu$ and standard deviation $\sigma$, along with a validity threshold value, to either a network storage device 108 via network processing unit 112 and LAN link 120 and interface 122 or to a local storage device 104 via local processor 106. The administrator also establishes password test processing on the processing unit associated with the storage device on which the data files are stored (i.e., either processor 106 or 112).

In an embodiment of the password test system of the present invention, a user password is selected and input through user input device 110 to the local processing unit 106 for verification via interface 124. Upon receipt of the identified password, processing unit 106, using the established password test processing, computes, as described above, the log likelihood function $llf$ for the identified password after retrieving the transition probability matrix T from the local storage device 104 via interface 116. Local processing unit 106 then computes BAp for the identified password after retrieving the mean $\mu$ and standard deviation $\sigma$ from the local storage device 104. If the new password falls within the threshold value which is also retrieved from storage device 104, it is validated by processing unit 106 and notified to the user input device 110 from which the password was identified. The validated password is then transferred to network storage device 108 via LAN link 126 and local storage device 104 and referred to in conjunction with further requested access to local processing unit 106 and the LAN network.

In another embodiment of the password test system of the present invention, the data files and password test processing are maintained on the network storage device 108 and network processing unit 112, respectively. User passwords are selected and input through user input device 110 via local processing unit 106 to network processing unit 112 via the applicable interfaces and LAN link. The selected password could also be input directly from user input device 114 to network processing unit 112 via LAN link 128 where dumb terminals are in use. Upon receipt of the identified password, network processing unit 112, using the established password test processing, computes the log likelihood function $llf$ for the identified password after retrieving the transition probability matrix T from the network storage device 108. Network processing unit 112 then calculates BAp for the identified password using the mean $\mu$ and standard deviation $\sigma$ also retrieved from network storage device 108. If the new password falls within the validity threshold value retrieved by processing unit 112 from storage device 108, it is validated by processor 112 and notified to the user input device 110 or 114 from which the password was identified via the applicable communication link. The validated password is then transferred to and stored in network storage device 108 and referred to in conjunction with further requested access to the LAN.

It will also be appreciated that the password processing capability can be implemented in part on local processing unit 106 and in part on network processing unit 112. Additionally, it will be understood by those skilled in the art that off-line processing could be performed using network processing unit 112 and network storage device 108 in lieu of local processing unit 106 and local storage device 104. Finally, the system of the present invention includes embodiments utilizing wide area networks as well as those which exclude networks all together.

As described above the invention provides a proactive password validation method and system which will protect against the selection of bad passwords belonging to a dictionary of bad passwords as well as bad noisy passwords. The on-line generation of bad noisy passwords is not required. The method and system also do not require the storage of a dictionary of bad passwords or large amounts of data and can easily be installed in a distributed computing environment. Utilizing the method or system, password validation can be performed quickly. After defining the bad password characteristics using a Markov model or other modelling technique, the actual validation of the proposed password can be performed on-line, in real time, using small amounts of computing power.

What is claimed:

1. An improved method for password validation comprising the steps of:
   (a) identifying bad passwords, wherein each said bad password is comprised of one or more characters;
   (b) computing a frequency of occurrence of said bad password characters;
   (c) computing a probability of occurrence T, within said bad passwords, of the bad password characters using the computed frequency of occurrence;
   (d) identifying a validation password, wherein said validation password is comprised of one or more characters; and
   (e) comparing said validation password characters with the probability of occurrence T of the bad password characters.

2. An improved method for password validation according to claim 1, further comprising the steps of (i) computing a first set of log likelihood functions $llf_1$ for the bad password characters using the computed probability of occurrence T; (ii) computing a mean $\mu$ and standard deviation $\sigma$ for said first set of log likelihood functions $llf_1$; and (iii) computing a second set of log likelihood functions $llf_2$ for the validation password characters using the computed probability of occurrence T; wherein in the comparing step the probability of occurrence T of the bad password characters is represented by the mean $\mu$ and the standard deviation $\sigma$ and the validation password characters are represented by said second set of log likelihood functions $llf_2$.

3. An improved method for password validation according to claim 2, wherein said step of comparing is comprised of the steps of (i) computing BAp using the equation $$BAp = \frac{\frac{llf_2}{l-x} - \mu}{\sigma}$$

where $l-x$ is a numeric value related to the number of validation password characters; (ii) establishing a validation threshold value; and (iii) accepting or rejecting said validation password based upon the correspondence between BAp and the validation threshold value.

4. An improved method for password validation according to claim 3, wherein the validation threshold value is $-2.6$.

5. An improved method for password validation according to claim 3 further comprising the step of electronically storing the means $\mu$, the standard deviation $\sigma$, the probability of occurrence T and the threshold valve.

6. An improved method for password validation according to claim 3, wherein the steps of computing the set of log likelihood functions $llf_2$ and BAp and accepting or rejecting the validation password are performed in real time.

7. An improved method for password validation according to claim 1, wherein the step of computing the probability of occurrence T is performed using a Markov model comprised of a common alphabet plus selected other characters.

8. An improved method for password validation according to claim 7, wherein said Markov model is a second order model.

9. An improved method for password validation according to claim 7, wherein said common alphabet plus selected other characters is comprised of twenty-eight characters.

10. An improved method for password validation according to claim 1, wherein said bad password characters and said validation password characters are formed into trigrams.

11. An improved method for password validation according to claim 10, wherein said sets of log likelihood functions are computed using the equation $$llf = \sum_{i=1}^{l-2} \ln(T[p_i, p_{i+1}, p_{i+2}])$$

where $l-2$ is a numeric value corresponding to the number of trigrams formed by the validation password characters and $P_i$, $P_{i+1}$ and $P_{i+2}$ represent the validation password characters forming a trigram.

12. An improved method for password validation according to claim 11, further comprising the step of adjusting the frequency of occurrence of certain of the bad password characters.

13. An improved method for password validation according to claim 12, wherein the step of adjusting the frequency of occurrence includes setting to zero each frequency of occurrence having a value equal to 1.

14. An improved method for password validation according to claim 13, wherein the step of adjusting the frequency of occurrence further includes the adjustment of each frequency of occurrence having a value of less than or equal to five.

15. An improved method for password validation according to claim 14, wherein the step of adjusting each frequency of occurrence with a value of less than or equal to five is performed using the equation $$f[i,j,k] \leftarrow \frac{(f[i,j,k] + 1) \times R[(f[i,j,k] + 1)]}{R[f[i,j,k]]}$$

where f[i,j,k] is the frequency of occurrence of a trigram of the bad password characters and R is an array representing how often a particular one of the bad password characters occurs.

16. An improved password validation system comprising:
   (a) means for accessing a data base of bad passwords, wherein each said bad password is comprised of one or more characters;
   (b) means for computing a frequency of occurrence of said bad password characters;
   (c) means for computing a probability of occurrence T, within said bad passwords, of the bad password characters using the computed frequency of occurrence;
   (d) means for inputting a validation password to the system, wherein said validation password is comprised of one or more characters; and
   (e) comparitor means for comparing said validation password characters with the probability of occurrence T of the bad password characters.

17. An improved password validation system according to claim 16, further comprising (i) means for computing a first set of log likelihood functions $llf_1$ for the bad password characters using the computed probability of occurrence T; (ii) means for computing a mean $\mu$ and standard deviation $\sigma$ for said first set of log likelihood functions $llf_1$; and (iii) means for computing a second set of log likelihood functions $llf_2$ for the validation password characters using the computed probability of occurrence T; wherein the comparitor means utilizes the mean $\mu$ and the standard deviation $\sigma$ to represent the probability of occurrence T of the bad password characters, and the second set of log likelihood functions $llf_2$ to represent the validation password characters.

18. An improved password validation system according to claim 17, wherein said comparitor means is comprised of (i) means for computing BAp which implements the equation $$BAp = \frac{\frac{llf_2}{l-x} - \mu}{\sigma}$$

where $l-x$ is a numeric value related to the number of validation password characters; (ii) means for accessing a validation threshold value; and (iii) means for accepting or rejecting said validation password based upon the correspondence between BAp and the validation threshold value.

19. An improved password validation system according to claim 18, wherein the validation threshold value is $-2.6$.

20. An improved password validation system according to claim 18, wherein, the validation password characters are in the form of trigrams and said means for computing sets of log likelihood functions implements the equation $$llf = \sum_{i=1}^{l-2} \ln(T[p_i, p_{i+1}, p_{i+2}])$$

where $l-2$ is a numeric value corresponding to the number of trigrams formed by the validation password characters and $P_i$, $P_{i+1}$ and $P_{i+2}$ represent the validation password characters forming a trigram.

21. An improved password validation system according to claim 20, further comprising means for adjusting the frequency of occurrence of certain of the bad password characters.

22. An improved password validation system according to claim 21, wherein the means for adjusting the frequency of occurrence sets to zero each frequency of occurrence having a value equal to 1.

23. An improved password validation system according to claim 22, wherein the means for adjusting the frequency of occurrence further adjusts each frequency of occurrence having a value of less than or equal to five.

24. An improved password validation according to claim 23, wherein the means for adjusting each frequency of occurrence with a value of less than or equal to five implements the equation $$f[i,j,k] \leftarrow \frac{(f[i,j,k] + 1) \times R[(f[i,j,k] + 1)]}{R[f[i,j,k]]}$$

where f[i,j,k] is the frequency of occurrence of a trigram of the bad password characters and R is an array representing how often a particular one of the bad password characters occurs.

25. An improved password validation system according to claim 18, wherein the means for computing the set of log likelihood functions $llf_2$ and BAp and the means for accepting or rejecting the validation password perform on-line and in real time.

26. An improved password validation system according to claim 25, further comprising means for electronically storing the mean $\mu$, the standard deviation $\sigma$, the probability of occurrence T and the validation threshold valve.

27. An improved password validation system according to claim 26, wherein said electronic storage means resides in a central server.

28. An improved password validation system according to claim 27, wherein said server is part of a local or wide area network.

29. An improved password validation system according to claim 18, wherein said means for computing the set of log likelihood functions $llf_2$ and BAp and said means for accepting or rejecting the validation password are part of a central security processor.

30. An improved password validation system according to claim 16, wherein the means for computing the probability of occurrence T utilizes a Markov model comprised of a common alphabet plus selected other characters.

31. An improved password validation system according to claim 30, wherein said Markov model is a second order model.

32. An improved password validation system according to claim 30, wherein said common alphabet plus selected other characters is comprised of twenty-eight characters.

* * * * *